(12) United States Patent
Hofmann et al.

(10) Patent No.: US 6,291,388 B1
(45) Date of Patent: Sep. 18, 2001

(54) DOUBLE METAL CYANIDE CATALYSTS FOR PRODUCING POLYETHER POLYOLS

(75) Inventors: Jörg Hofmann, Leverkusen; Pieter Ooms, Krefeld; Pramod Gupta, Bedburg; Walter Schäfer, Leichlingen, all of (DE)

(73) Assignee: Bayer Aktiengesellschaft, Leverkusen (DE)

( * ) Notice: Subject to any disclaimer, the term of this patent is extended or adjusted under 35 U.S.C. 154(b) by 0 days.

(21) Appl. No.: 09/623,648

(22) PCT Filed: Feb. 25, 1999

(86) PCT No.: PCT/EP99/01203

§ 371 Date: Sep. 6, 2000

§ 102(e) Date: Sep. 6, 2000

(87) PCT Pub. No.: WO99/46042

PCT Pub. Date: Sep. 16, 1999

(30) Foreign Application Priority Data

Mar. 10, 1998 (DE) ................................................ 198 10 269

(51) Int. Cl.$^7$ .............................. B01J 31/06; C07C 43/32
(52) U.S. Cl. ........................... 502/154; 502/156; 502/159
(58) Field of Search ................................. 502/156, 154, 502/159; 568/596, 599

(56) References Cited

U.S. PATENT DOCUMENTS

| | | | |
|---|---|---|---|
| 3,404,109 | 10/1968 | Milgrom | 260/611 |
| 3,829,505 | 8/1974 | Herold | 260/611 B |
| 3,941,849 | 3/1976 | Herold | 260/607 A |
| 5,158,922 | 10/1992 | Hinney et al. | 502/175 |
| 5,482,908 | * 1/1996 | Le-Khac | 502/156 |
| 5,536,883 | 7/1996 | Le-Khac | 568/620 |
| 5,627,120 | 5/1997 | Le-Khac | 502/156 |

FOREIGN PATENT DOCUMENTS

| | | |
|---|---|---|
| 0 761 708 | 3/1997 | (EP) . |
| 761708 | 3/1997 | (EP) . |

OTHER PUBLICATIONS

Houben–Weyl. Methoden der Organischem Chemie, vol. 14/2, Makromolekulare Stoffe, 4$^{th}$ ed. (month unavailable), 1963, pp. 425–453, Dr. habil. Richard Wegler, "VI. Polymerisations—und Polyadditionsprodukte von cyclischen Monomeren mit Heteroatomen Als Ringglieder".

Houben–Weyl. Methoden der Organischem Chemie, vol. E20, Makromolekulare Stoffe, 4$^{th}$ ed. (month unavailable), 1987, pp. 1367–1368, Dr. R. C. Schulz "b) Polymere mit Heteroatomen in der Polymer–Hauptkette".

Encyclopedia of Polymer Science & Engineering, vol. 6, 2$^{nd}$ ed., (month unavailable) 1987, pp. 225–230, "1,2–Epoxide Polymers. Ethylene Oxide polymers and Copolymers".

Encyclopedia of Polymer Science & Engineering, vol. 6, 2$^{nd}$ ed., (month unavailable) 1987, pp. 234–254, "1,2–Expoxide Polymers. Polymers".

* cited by examiner

Primary Examiner—Johann Richter
Assistant Examiner—Brian J. Davis
(74) Attorney, Agent, or Firm—Joseph C. Gil; Carolyn M. Sloane

(57) ABSTRACT

The invention relates to new, improved double metal cyanide (DMC) catalysts for preparing polyetherpolyols by polyaddition of alkylene oxides to starter compounds containing active hydrogen atoms, wherein the catalyst contains a double metal cyanide compound, an organic coordination ligand and 5 to 80 wt. %, with respect to the amount of catalyst, of an ethylene oxide polyether with a number average molecular weight greater than 500. The new, improved catalysts have a greatly increased reactivity for polyetherpolyol preparation.

9 Claims, No Drawings

DOUBLE METAL CYANIDE CATALYSTS FOR PRODUCING POLYETHER POLYOLS

The invention relates to new, improved double metal cyanide (DMC) catalysts for preparing polyetherpolyols by the polyaddition of alkylene oxides to starter compounds containing active hydrogen atoms.

Double metal cyanide (DMC) catalysts for the polyaddition of alkylene oxides to starter compounds containing active hydrogen atoms are known (see, for example, U.S. Pat. No. 3,404,109, U.S. Pat. No. 3,829,505, U.S. Pat. No. 3,941,849 and U.S. Pat. No. 5,158,922). The use of these DMC catalysts for preparing polyetherpolyols has the particular effect of reducing the proportion of monofunctional polyethers with terminal double bonds, so-called monools, as compared with the conventional method for preparation of polyetherpolyols by means of alkali metal catalysts, such as alkali metal hydroxides. The polyetherpolyols obtained in this way may be processed to produce high quality polyurethanes (e.g. elastomers, foams, coatings). DMC catalysts are usually obtained by reacting an aqueous solution of a metal salt with the aqueous solution of a metal cyanide salt in the presence of a low molecular weight organic coordination ligand, e.g. an ether. In a typical catalyst preparation, for example, aqueous solutions of zinc chloride (in excess) and potassium hexacyanocobaltate are mixed and then dimethoxyethane (glyme) is added to the suspension which is formed. After filtering and washing the catalyst with aqueous glyme solution, an active catalyst of the general formula

$Zn_3[Co(CN)_6]_2 \cdot xZnCl_2 \cdot yH_2O \cdot z$ glyme is obtained (see e.g. EP 700 949).

U.S. Pat. No. 5,482,908, U.S. Pat. No. 5,536,883 and EP 700 949 disclose improved DMC catalysts which contain a polyether with a number average molecular weight greater than 500, in addition to the double metal cyanide compound and the organic coordination ligand. The improved DMC catalysts have exceptionally high activity and enable the preparation of polyetherpolyols with the addition of very small amounts of catalyst (25 ppm: see example 8 in EP 700 949). The highly active DMC catalyst formulations described in U.S. Pat. No. 5,482,908, U.S. Pat. No. 5,536,883 and EP 700 949 preferably contain polyetherpolyols with hydroxy-functionalities of 2 to 8 as polyethers. Polyetherpolyols suitable for use in the improved DMC catalysts are poly(oxypropylene)polyols, EO-terminated poly(oxypropylene)polyols, mixed EO/PO-polyols, butylene oxide polymers, butylene oxide copolymers with ethylene oxide and/or propylene oxide and poly(tetramethylene-ether) glycols. Poly(oxypropylene)-polyols are particularly preferred (see page 4, lines 8–12 in EP 700 949, column 4, lines 26–34 in U.S. Pat. No. 5,482,908 and column 4, lines 32–40 in U.S. Pat. No. 5,536,883). On the other hand, polyethyleneglycols, i.e. pure ethylene oxide polyetherpolyols are generally referred to as unsuitable for preparing improved, highly active DMC catalysts (see page 4, lines 10–11 in EP 700 949, column 4, lines 31–32 in U.S. Pat. No. 5,482,908 and column 4, lines 37–38 in U.S. Pat. No. 5,536,883).

U.S. Pat. No. 5,627,120 and WO 97/40086 disclose further highly active DMC catalysts which contain a polyether with a number average molecular weight of less than 500, in addition to the double metal cyanide compound and the organic coordination ligand. Interestingly, polyethylene glycols with a number average molecular weight of less than 500 are also particularly preferred for preparing the DMC catalysts described in U.S. Pat. No. 5,627,120 and WO 97/40086 (see column 3, lines 57–60 in U.S. Pat. No. 5,627,120 and page 7, lines 8–10 in WO 97/40086).

The object of the present invention is now to provide further improved DMC catalysts for use in the polyaddition of alkylene oxides to appropriate starter compounds and which have clearly increased catalyst activity when compared with the types of catalysts known hitherto. Ideally, the catalyst may then be used at such a low concentration (15 ppm or less), due to the increased activity, that otherwise costly catalyst separation processes are no longer required and the product can be used directly for polyurethane applications.

Surprisingly, it has now been found that DMC catalysts which contain a double metal cyanide compound, an organic coordination ligand and 5 to 80 wt. %, with respect to the amount of DMC catalyst, of an ethylene oxide polyether with a number average molecular weight greater than 500, have a greatly increased activity for the polyaddition of alkylene oxides to starter compounds containing active hydrogen atoms and therefore enable the preparation of polyetherpolyols at very low catalyst concentrations (15 ppm or less).

The present invention therefore provides new, improved double metal cyanide (DMC) catalysts comprising
  a) a double metal cyanide compound and
  b) an organic coordination ligand,
which are characterised in that they contain 5 to 80 wt. %, with respect to the amount of final catalyst, of an ethylene oxide polyether with a number average molecular weight greater than 500.

The catalysts according to the invention may also optionally contain a further 1 to 10 wt. % of water and/or 5 to 25 wt. % of water-soluble metal salt from preparation of the double metal cyanide.

Double metal cyanide compounds a) which are suitable for catalysts according to the invention are the reaction products of a water-soluble metal salt and a water-soluble metal cyanide salt.

The water-soluble metal salt preferably has the general formula $M(X)_n$, wherein M is selected from the metals Zn(II), Fe(II), Ni(II), Mn(II), Co(II), Sn(II), Pb(II), Fe(III), Mo(IV), Mo(VI), Al(III), V(V), V(IV), Sr(II), W(IV), W(VI), Cu(II) and Cr(III). Zn(II), Fe(II), Co(II) and Ni(II) are particularly preferred. X is an anion, preferably selected from the group of halides, hydroxides, sulfates, carbonates, cyanates, thiocyanates, isocyanates, isothiocyanates, carboxylates, oxalates and nitrates. n has the value 1, 2 or 3.

Examples of suitable metal salts are zinc chloride, zinc bromide, zinc acetate, zinc acetylacetonate, zinc benzoate, zinc nitrate, iron(II) sulfate, iron(II) bromide, iron(II) chloride, cobalt(II) chloride, cobalt(II) thiocyanate, nickel (II) chloride and nickel(II) nitrate. Mixtures of different metal salts may also be used.

The water-soluble metal cyanide salt preferably has the general formula $(Y)_a M'(CN)_b (A)_c$, wherein M' is selected from the metals Fe(II), Fe(III), Co(II), Co(III), Cr(II), Cr(III), Mn(II), Mn(III), Ir(III), Ni(II), Rh(III), Ru(II), V(IV) and V(V). M' is particularly preferably selected from the metals Co(II), Co(III), Fe(II), Fe(III), Cr(III), Ir(III) and Ni(II). The water-soluble metal cyanide salt may contain one or more of these metals. Y is an alkali metal ion or an alkaline earth metal ion. A is an anion selected from the group of halides, hydroxides, sulfates, carbonates, cyanates, thiocyanates, isocyanates, isothiocyanates, carboxylates, oxalates or nitrates. Both a and b are positive integers ($\geq 1$), wherein the values for a, b and c are chosen in such a way that the metal cyanide salt does not carry an electrical charge; c preferably has the value 0. Examples of suitable water-soluble metal cyanide salts are potassium hexacyanocobaltate(II), potassium hexacyanoferrate(II), potassium hexacyanoferrate(III), calcium hexacyanocobaltate(II) and lithium hexacyano-cobaltate (III).

Examples of suitable double metal cyanide compounds a) which may be used in catalysts according to the invention are zinc hexacyanocobaltate(III), zinc hexacyanoferrate(II), zinc hexacyanoferrate(III), nickel(II) hexacyanoferrate(II) and cobalt(II) hexacyanocobaltate(III). Further examples of suitable double metal cyanide compounds are mentioned, for example, in U.S. Pat. No. 5,158,922 (column 8, lines 29–66). Zinc hexacyanocobaltate(III) is preferably used.

DMC catalysts according to the invention contain an organic coordination ligand b), since this may, for example, increase the catalytic activity. Suitable organic coordination ligands are known in principle and are described in detail in the previously cited prior art (see e.g. column 6, lines 9–65 in U.S. Pat. No. 5,158,922). The coordination ligand is added either during preparation of the catalyst or immediately after precipitating the catalyst. The coordination ligand is usually used in excess. Preferred coordination ligands are water-soluble, organic compounds with heteroatoms which can form complexes with the double metal cyanide compound. Suitable organic coordination ligands are e.g. alcohols, aldehydes, ketones, ethers, esters, amides, ureas, nitriles, sulfides and mixtures of these. Preferred organic coordination ligands are water-soluble aliphatic alcohols, such as e.g. ethanol, isopropanol, n-butanol, iso-butanol, sec.-butanol and tert.-butanol. Tert.-butanol is particularly preferred.

DMC catalysts according to the invention contain the double metal cyanide compounds in amounts of 20 to 90 wt. %, preferably 25 to 80 wt. %, with respect to the amount of DMC catalyst and contain the organic coordination ligand in amounts of 1 to 30, preferably 2 to 20 wt. %, again with respect to the amount of DMC catalyst.

DMC catalysts according to the invention contain 5 to 80 wt. %, with respect to the amount of DMC catalyst, of an ethylene oxide polyether with a number average molecular weight greater than 500. Preferred catalysts contain 10 to 60 wt. % of the ethylene oxide polyether.

Ethylene oxide polyethers which are suitable for preparing catalysts according to the invention are high molecular weight substances with the characteristic structural feature of the oxyethylene group —O—CH$_2$—CH$_2$— as a repeating unit in the chain. They are generally obtained by ring-opening polymerisation of ethylene oxide (Oxiran) with catalysts such as, for example, Lewis acids (e.g. boron trifluoride, tin tetrachloride, zinc dichloride), alkylzinc or alkylammonium compounds, strontium or calcium carbonate, calcium amide, calcium amide alkoxide, alkali metal or alkaline earth metal hydroxides, alkanolates or phenolates.

Methods for preparing ethylene oxide polyethers are generally well-known and are described in detail in, for example, "Houben-Weyl. Methoden der organischen Chemie", vol. 14/2, Makromolekulare Stoffe, 4th edition, 1963, pp. 425–453, "Houben-Weyl, Methoden der organischen Chemie", vol. E20, Makromolekulare Stoffe, 4th edition, 1987, pp. 1367–1368 and "Encyclopedia of Polymer Science and Engineering", vol. 6, 2nd edition, 1987, pp. 225–230 and 234–254.

The ethylene oxide polyethers may contain any terminal groups at all, in particular hydroxy, amino, ester, acid, acid amide or ether terminal groups, preferably hydroxy, ester or ether terminal groups.

Ethylene oxide polyethers which have hydroxy terminal groups and hydroxy-functionalities of 1 to 8, preferably 1 to 3, and number average molecular weights between 500 and $10^7$, in particular between 500 and $5 \times 10^4$, are preferably used. They are generally obtained by ring-opening polymerisation of ethylene oxide in the presence of appropriate starter compounds which contain active hydrogen atoms.

In addition to ethylene oxide homopolymers, block copolymers may also be used in which blocks of polyvinyl compounds (e.g. polystyrene, poly(α-methylstyrene), polymethylmethacrylate, polybutylmethacrylate) are linked to polyethylene oxide blocks with number average molecular weights greater than 500.

Any mixtures of the previously mentioned ethylene oxide polyethers may also be used.

Analysis of the catalyst composition is generally achieved by means of elemental analysis, thermogravimetry and extractive removal of the ethylene oxide polyether fraction followed by gravimetric determination.

Catalysts according to the invention may be crystalline, partly crystalline or amorphous. The crystalline state is conventionally analysed using powder X-ray diffractometry.

Improved DMC catalysts according to the invention are conventionally prepared in aqueous solution by reacting metal salt (in excess) and metal cyanide salt in the presence of the organic coordination ligand and the ethylene oxide polyether.

Preferably, the aqueous solutions of metal salt (e.g. zinc chloride, used in stoichiometric excess (at least 50% with respect to the metal cyanide salt)) and the metal cyanide salt (e.g. potassium hexacyanocobaltate) are first reacted in the presence of the organic coordination ligand (e.g. tert.-butanol), wherein a catalyst suspension is produced which contains the double metal cyanide compound (e.g. zinc hexacyanocobaltate), excess metal salt, water and the organic coordination ligand.

The organic coordination ligand may either be present in one or both aqueous solutions, or it may be added to the suspension immediately after precipitation of the double metal cyanide compound. It has proven advantageous to mix the aqueous solutions and the organic coordination ligand with vigorous stirring.

The catalyst suspension produced is then treated with ethylene oxide polyether. The ethylene oxide polyether is preferably used as a mixture. with water and organic coordination ligand.

The catalyst containing the ethylene oxide polyether is isolated from the suspension by known techniques such as e.g. centrifuging or filtering.

To increase the activity of the catalyst, it is then advantageous to wash the isolated catalyst with an aqueous solution of the organic coordination ligand (e.g. by resuspending and then isolating again by centrifuging or filtering). In this way, for example, water-soluble secondary products, such as potassium chloride, which have a negative effect on the polyaddition reaction, can be removed from the catalyst according to the invention.

The amount of organic coordination ligand in the aqueous wash solution is preferably between 40 and 80 wt. %. Furthermore, it is advantageous to add some ethylene oxide polyether, preferably in the range between 0.5 and 5 wt. %, to the aqueous wash solution.

Moreover, it is advantageous to wash the catalyst more than once. For this purpose, for instance, the first wash process may be repeated. Preferably, however, non-aqueous solutions, e.g. a mixture of organic coordination ligand and ethylene oxide polyether, should be used for subsequent wash processes.

The washed catalyst, optionally after being powdered, is finally dried at temperatures of 20 to 100° C. and pressures of 0.1 mbar to atmospheric pressure (1013 mbar).

The invention also provides use of the improved DMC catalysts according to the invention to prepare polyetherpolyols by polyaddition of alkylene oxides to starter compounds containing active hydrogen atoms.

Preferred alkylene oxides for use here are ethylene oxide, propylene oxide, butylene oxide and mixtures thereof. The polyether chains being formed by alkoxylation may be built up, for instance, using only one monomeric epoxide or else statistically or randomly with 2 or 3 different monomeric epoxides. Details may be found in "Ullmanns Encyclopädie der industriellen Chemie", English language edition, 1992, vol. A21, pages 670–671.

The starter compounds containing active hydrogen atoms used are compounds with molecular weights of 18 to 2000 and 1 to 8 hydroxyl groups. Examples which may be mentioned are: ethylene glycol, diethylene glycol, triethylene glycol, 1,2-propylene glycol, 1,4-butanediol, hexamethylene glycol, bisphenol A, trimethylolpropane, glycerol, pentaerythritol, sorbitol, cane sugar, degraded starch and water.

Advantageously, those starter compounds containing active hydrogen atoms which are used are those which have been prepared e.g. by conventional alkali metal catalysis, from the previously mentioned low molecular weight starters and are oligomeric alkoxylation products with molecular weights of 200 to 2000.

The polyaddition of alkylene oxides to starter compounds containing active hydrogen atoms catalysed by catalysts according to the invention generally takes place at temperatures of 20 to 200° C., preferably in the range from 40 to 180° C., in particular at temperatures of 50 to 150° C. The reaction may be performed at total pressures from 0.001 to 20 bar. The polyaddition reaction may be performed in bulk or in an inert, organic solvent such as toluene and/or THF. The amount of solvent is normally 10 to 30 wt. %, with respect to the amount of polyetherpolyol being prepared.

The catalyst concentration is chosen so that good control of the polyaddition reaction is possible under the given conditions of reaction. The catalyst concentration is generally in the range from 0.0005 wt. % to 1 wt. %, preferably in the range from 0.001 wt. % to 0.1 wt. %, with respect to the amount of polyetherpolyol being prepared.

The reaction times for polyaddition are in the range from a few minutes to several days.

The molecular weights of polyetherpolyols prepared by the process according to the invention are in the range from 500 to 100000 g/mol, preferably in the range from 1000 to 50000 g/mol, in particular in the range from 2000 to 20000 g/mol.

The polyaddition reaction may be performed continuously, in a batch process or in a semi-batch process.

Catalysts according to the invention generally require an induction period of a few minutes to several hours.

The induction periods for polyetherpolyol preparation using the new catalysts according to the invention are generally shorter than those produced when using the previously disclosed DMC catalysts.

As a result of the greatly increased catalytic activity, the alkoxylation times when using the new catalysts according to the invention are much shorter than when using the previously disclosed highly active DMC catalysts.

This leads, for example, to a shortening of the overall reaction times (sum of the induction and alkoxylation times) by about 25–60% as compared with the DMC catalysts described in U.S. Pat. No. 5,482,908, U.S. Pat. No. 5,536,883 and EP 700 949 (see examples 7–10 and comparison example 11).

Catalysts according to the invention may be used with no problems in such low concentrations (15 ppm and less, see examples 7–10), due to their greatly increased activity, that removal of the catalyst from the polyol is not generally required for use in polyurethane applications, without the product quality being adversely affected.

EXAMPLES

Catalyst Preparation

Example 1

Preparation of a DMC catalyst using a polyethylene glycol with a number average molecular weight of 2000 (catalyst A).

A solution of 12.5 g (91.5 mmol) of zinc chloride in 20 ml of distilled water is added to a solution of 4 g (12 mmol) of potassium hexacyanocobaltate in 70 ml of distilled water, with vigorous stirring (24000 rpm). Immediately afterwards, a mixture of 50 g of tert.-butanol and 50 g of distilled water is added to the suspension produced and the mixture is then stirred vigorously (24000 rpm) for 10 min. Then a mixture of 1 g of a polyethylene glycol with a number average molecular weight of 2000, 1 g of tert.-butanol and 100 g of distilled water is added and stirring is continued for 3 min (1000 rpm). The solid is isolated by filtration, then stirred (10000 rpm) for 10 min with a mixture of 70 g of tert.-butanol, 30 g of distilled water and 1 g of the polyethylene glycol mentioned above and filtered again. Finally, the product is stirred (10000 rpm) for another 10 min with a mixture of 100 g of tert.-butanol and 0.5 g of the polyethylene glycol mentioned above. After filtration the catalyst is dared to constant weight at 50° C. and atmospheric pressure.

Yield of dry, powdered catalyst: 5.97 g

Elemental analysis, thermogravimetric analysis and extraction:

cobalt=10.0%, zinc=22.0%, tert.-butanol=4.2%, ethylene oxide polyether=41.1%.

Example 2

Preparation of a DMC catalyst using an ethylene oxide polyether, started on stearyl alcohol, with a number average molecular weight of 2470 (catalyst B).

The same procedure as described in example 1 was used, but:

An ethylene oxide polyether, started on stearyl alcohol, with a number average molecular weight of 2470 was used instead of the ethylene oxide polyether in example 1.

Yield of dry, powdered catalyst: 6.06 g.

Elemental analysis, thermogravimetric analysis and extraction:

cobalt=9.1%, zinc=21.0%, tert.-butanol=3.9%, ethylene oxide polyether=31.0%.

Example 3

Preparation of a DMC catalyst using an ethylene oxide polyether, started on a mixture of fatty alcohols ($C_{12,1}$-), with a number average molecular weight of 720 (catalyst C).

The same procedure as described in example 1 was used, but:

An ethylene oxide polyether, started on a mixture of fatty alcohols ($C_{12-18}$), with a number average molecular weight of 720 was used instead of the ethylene oxide polyether in example 1.

Yield of dry, powdered catalyst: 5.40 g.

Elemental analysis, thermogravimetric analysis and extraction:

cobalt=10.7%, zinc=24.1%, tert.-butanol=4.8%, ethylene oxide polyether=29.3%.

Example 4

Preparation of a DMC catalyst using a polystyrene/polyethylene oxide AB block copolymer (number average molecular weight of each polystyrene and polyethylene oxide segment 1000) (catalyst D).

The same procedure as described in example 1 was used, but:

A polystyrene/polyethylene oxide AB block copolymer (number average molecular weight of each polystyrene and polyethylene oxide segment 1000; Th. Goldschmidt AG) was used instead of the ethylene oxide polyether in example 1.

Yield of dry, powdered catalyst: 6.36 g.

Elemental analysis, thermogravimetric analysis and extraction:

cobalt=9.1%, zinc=20.4%, tert.-butanol=4.6%, ethylene oxide polyether=27.5%.

Comparison Example 5

Preparing a DMC catalyst using a polypropylene glycol with a number average molecular weight of 2000 (catalyst E, synthesis in accordance with EP 700 949).

A solution of 12.5 g (91.5 mmol) of zinc chloride in 20 ml of distilled water is added with vigorous stirring (24000 rpm) to a solution of 4 g, (12 mmol) of potassium hexacyanocobaltate in 70 ml of distilled water. Immediately afterwards, a mixture of 50 g of tert.-butanol and 50 g of distilled water is added to the suspension produced and then the mixture is stirred vigorously (24000 rpm) for 10 min. Then a mixture of 1 g of a polypropylene glycol with a number average molecular weight of 2000, 1 g of tert.-butanol and 100 g of distilled water is added and stirring (1000 rpm) is continued for 3 min. The solid is isolated by filtration and is then stirred (10000 rpm) with a mixture of 70 g of tert.-butanol, 30 g of distilled water and 1 g of the polypropylene glycol mentioned above and filtered again. Finally, it is stirred again (10000 rpm) for 10 min with a mixture of 100 g of tert.-butanol and 0.5 g of the propylene glycol mentioned above. After filtration the catalyst is dried to constant weight at 50° C. and atmospheric pressure.

Yield of dry, powdered catalyst: 6.23 g.

Elemental analysis and thermogravimetric analysis:

cobalt 11.6%, zinc=24.6%, tert.-butanol=3.0%, polypropylene glycol=25.8%.

Comparison Example 6

Preparation of a DMC catalyst using a polyethylene glycol with a number average molecular weight of 300 (catalyst F).

The same procedure as described in example 1 was used, but:

A polyethylene glycol with a number average molecular weight of 300 (Aldrich Co.) was used instead of the ethylene oxide polyether in example 1.

Yield of dry, powdered catalyst: 5.63 g.

Elemental analysis, thermogravimetric analysis and extraction:

cobalt=10.0%, zinc=24.0%, tert.-butanol=3.8%, ethylene oxide polyether=32.3%.

Preparing Polyetherpolyols

General procedure 50 g of polypropylene glycol starter (molecular weight=1000 g/mol) and 3 mg of catalyst (15 ppm, with respect to the polyol being produced) were initially placed in a 500 ml pressurised reactor under a protective gas (argon) and heated to 105° C. with stirring. Then propylene oxide (about 5 g) is added in one portion until the total pressure has risen to 2.5 bar. More propylene oxide is added only when an accelerated drop in pressure is observed in the reactor. This accelerated drop in pressure indicates that the catalyst has been activated. Then the remaining propylene oxide (145 g) is added continuously at a constant pressure of 2.5 bar. When all the propylene oxide has been added and the reaction has proceeded for a further 5 hours at 105° C., volatile constituents are distilled off at 90° C. (1 mbar) and the reactor is then cooled to room temperature.

The polyetherpolyols obtained were characterised by determining the OH values, the double bond contents and the viscosities.

Progress of the reaction was followed on time/conversion curves (propylene oxide consumption [g] against reaction time [min]).

The induction times were determined from the intersection of the tangents at the steepest point on the time/conversion curve with the extended base line for the curve.

The definitive propoxylation times for catalyst activity correspond to the time between catalyst activation (end of the induction period) and the completion of propylene oxide addition.

The total reaction time is the sum of the induction and propoxylation times.

Example 7

| Preparing a polyetherpolyol with catalyst A (15 ppm) | | |
|---|---|---|
| Total reaction time: | | 395 min |
| Polyetherpolyol: | OH value (mg KOH/g): | 29.8 |
| | Double bond content (mmol/kg): | 11 |
| | Viscosity at 25° C. (mPas): | 935 |

Example 8

| Preparing a polyetherpolyol with catalyst B (15 ppm) | | |
|---|---|---|
| Total reaction time: | | 475 min |
| Polyetherpolyol: | OH value (mg KOH/g): | 29.2 |
| | Double bond content (mmol/kg): | 8 |
| | Viscosity at 25° C. (mPas): | 944 |

Example 9

| Total reaction time: | | 655 min |
|---|---|---|
| Polyetherpolyol: | OH value (mg KOH/g): | 29.8 |
| | Double bond content (mmol/kg): | 7 |
| | Viscosity at 25° C. (mPas): | 950 |

Example 10

| Preparing a polyetherpolyol with catalyst D (15 ppm) | | |
|---|---|---|
| Total reaction time: | | 595 min |
| Polyetherpolyol: | OH value (mg KOH/g): | 29.3 |
| | Double bond content (mmol/kg): | 10 |
| | Viscosity at 25° C. (mPas): | 958 |

Examples 7–10 show that the new DMC catalysts according to the invention can be used at such low concentrations, due to their exceptionally high activity for polyetherpolyol preparation, that separation of the catalyst from the polyol is not required.

Comparison Example 11

| Preparing a polyetherpolyol with catalyst E (15 ppm) | | |
|---|---|---|
| Total reaction time: | | 895 min |
| Polyetherpolyol: | OH value (mg KOH/g): | 29.8 |
| | Double bond content (mmol/kg): | 6 |
| | Viscosity at 25° C. (mPas): | 955 |

A comparison of example 7 with comparison example 11 shows that the new DMC catalysts according to the invention, which contain an organic coordination ligand (tert.-butanol) and a polyethylene glycol, are much more active than the previously disclosed highly active DMC catalysts, which contain an organic coordination ligand (tert.-butanol) and a polypropylene glycol (with the same number average molecular weight as the polyethylene glycol used in the catalyst according to the invention). Polyetherpolyol preparation with the new catalysts according to the invention is therefore possible within a much shorter total reaction time.

Comparison Example 12

| Preparing a polyetherpolyol with catalyst F (15 ppm) | |
|---|---|
| Total reaction time: | >900 min |

(catalyst was deactivated during the course of the reaction).

Comparison example 12 shows that the DMC catalysts disclosed in U.S. Pat. No. 5,627,120 and WO 97/40086, which contain a polyethylene glycol with a number average molecular weight less than 500, in addition to the double metal cyanide compound and the organic coordination ligand, are much less active than the catalysts according to the invention. Polyetherpolyol preparation is therefore again only possible at very low concentrations (15 ppm) by using catalysts according to the invention.

What is claimed is:

1. A double metal cyanide (DMC) catalyst comprising:

a) a double metal cyanide compound; and b) an organic coordination ligand;

further comprising 5 to 80 wt. %, with respect to the amount of DMC catalyst, of an ethylene oxide polyether with a number average molecular weight greater than 500.

2. The DMC catalyst of claim 1, the double metal cyanide compound comprising zinc hexacyanocobaltate(III).

3. The DMC catalyst of claim 1, the organic coordination ligand comprising tert-butanol.

4. The DMC catalyst of claim 1, wherein the ethylene oxide polyether is present in an amount of from about 10 to 60 wt. %.

5. The DMC catalyst of claim 1, in which the ethylene oxide polyether has hydroxy terminal groups, a hydroxy-functionality of from 1 to 8 and a number average molecular weight between 500 and $10^7$.

6. The DMC catalyst of claim 5, in which the ethylene oxide polyether has a hydroxy functionality of from 1 to 3 and a number average molecular weight between 500 and $5 \times 10^4$.

7. The DMC catalyst of claim 1, in which the ethylene oxide polyether is a block copolymer having blocks of polyvinyl compounds linked to polyethylene oxide blocks.

8. A process for preparing DMC catalysts according to claim 1, comprising the steps of: (a) reacting an excess of at least one metal salt with at least one metal cyanide salt in aqueous solution in the presence of an organic coordination ligand and an ethylene oxide polyether; (b) isolating the resultant catalyst; (c) washing the isolated catalyst; and (d) drying the isolated catalyst.

9. In a process for the production of polyetherpolyols by polyaddition of alkylene oxides to starter compounds containing active hydrogen atoms, the improvement wherein said polyaddition of alkylene oxides occurs in the presence of a DMC catalyst of claim 1.

* * * * *